(12) United States Patent
Lawler et al.

(10) Patent No.: US 6,960,730 B2
(45) Date of Patent: Nov. 1, 2005

(54) DOWNLOADABLE DIGITAL RATE CALCULATING SCALE

(75) Inventors: Matthew Lawler, Homer Glen, IL (US); Paul Nizzere, Darien, IL (US); Dennis Leonard, Chicago, IL (US); Christopher Chudek, Atlanta, GA (US); John B. Salzman, Chicago, IL (US); Jacqueline M. Vossler, Chicago, IL (US); Prathip Govindan, Atlanta, GA (US); Arpita Gillis, Atlanta, GA (US); Dung Cao, Ho Chi Minh (VN); Hiep Nguyen, Ho Chi Minh (VN); Thai Ha, Ho Chi Minh (VN); Trung Le, Melbourne (AU); Ngoc Do, Ho Chi Minh (VN)

(73) Assignee: Pelstar, L.L.C., Bridgeview, IL (US)

( * ) Notice: Subject to any disclaimer, the term of this patent is extended or adjusted under 35 U.S.C. 154(b) by 56 days.

(21) Appl. No.: 10/377,095

(22) Filed: Feb. 28, 2003

(65) Prior Publication Data

US 2004/0168835 A1    Sep. 2, 2004

(51) Int. Cl.⁷ ......................................... G01G 19/415
(52) U.S. Cl. ..................... 177/25.15; 705/407; 705/414
(58) Field of Search ................................ 705/407, 414; 177/25.15

(56) References Cited

U.S. PATENT DOCUMENTS

| | | | |
|---|---|---|---|
| 3,635,297 A | 1/1972 | Salava | 177/5 |
| 3,951,221 A | 4/1976 | Rock | 177/1 |
| 4,084,242 A | 4/1978 | Conti | 705/407 |
| 4,122,532 A | 10/1978 | Dlugos et al. | 705/407 |
| 4,138,735 A | 2/1979 | Allocca et al. | 705/409 |
| 4,286,325 A | 8/1981 | Dlugos et al. | 705/402 |
| 4,320,461 A | 3/1982 | Dlugos | 705/410 |
| D274,795 S | 7/1984 | Wirth | D10/91 |
| 4,462,473 A | 7/1984 | Valestin | 177/25.15 |
| 4,495,581 A | 1/1985 | Piccione | 705/402 |
| 4,499,545 A | 2/1985 | Daniels et al. | 705/402 |
| 4,504,915 A | 3/1985 | Daniels et al. | 705/409 |
| 4,506,330 A | 3/1985 | Dlugos | 705/402 |
| 4,516,209 A | 5/1985 | Scribner | 705/406 |
| 4,535,419 A | 8/1985 | Dlugos et al. | 705/407 |
| 4,598,780 A | 7/1986 | Iwasaki et al. | 177/3 |
| 4,649,490 A | 3/1987 | Manduley et al. | 705/407 |

(Continued)

FOREIGN PATENT DOCUMENTS

| | | |
|---|---|---|
| EP | 0 099 666 A2 | 2/1984 |
| EP | 0 155 671 A2 | 9/1985 |
| GB | 2 185443 A | 7/1987 |

OTHER PUBLICATIONS

Product brochure of Pelouze®, (a product of Signature Brands, Inc.) Heavy Duty Portion Control Scale Model FS6 Operating Instructions, (two-sided), ©1997.

*Primary Examiner*—Randy W. Gibson
(74) *Attorney, Agent, or Firm*—Wallenstein Wagner & Rockey, Ltd.

(57) ABSTRACT

A downloadable postage rate calculating device including a platform for receiving a parcel and providing a weight for the parcel, and a processor configured to receive current rates information downloaded from a computer or other similar device. The processor calculates a postage amount for the parcel based on at least a portion of the current rates information and the weight of the parcel. The processor can also compare the postage amount for a first carrier and shipping method, with that of a second carrier and shipping method, or between two shipping methods offered by the same carrier.

24 Claims, 11 Drawing Sheets

U.S. PATENT DOCUMENTS

| | | | |
|---|---|---|---|
| 4,660,160 A | 4/1987 | Tajima et al. | 702/173 |
| 4,718,506 A | 1/1988 | Hills | 177/25.15 |
| 4,802,218 A | 1/1989 | Wright et al. | 705/60 |
| D300,124 S | 3/1989 | Bungener | D10/91 |
| 4,872,119 A | 10/1989 | Kajimoto | 705/402 |
| 4,900,904 A | 2/1990 | Wright et al. | 235/381 |
| D307,873 S | 5/1990 | Hart et al. | D10/94 |
| D313,565 S | 1/1991 | Carnevale | D10/94 |
| 5,024,282 A | 6/1991 | Raikes et al. | 177/25.15 |
| 5,050,694 A | 9/1991 | Liang | 177/262 |
| 5,072,397 A | 12/1991 | Barns-Slavin et al. | 705/402 |
| 5,117,364 A | 5/1992 | Barns-Slavin et al. | 705/402 |
| 5,233,532 A | 8/1993 | Ramsden | 705/407 |
| 5,255,196 A | 10/1993 | Tran et al. | 705/407 |
| 5,307,281 A | 4/1994 | Wollmann | 705/407 |
| 5,337,246 A | 8/1994 | Carroll et al. | 705/402 |
| 5,340,948 A | 8/1994 | Ramsden | 177/25.15 |
| 5,369,221 A | 11/1994 | Ramsden | 177/25.15 |
| 5,406,036 A | 4/1995 | Haug | 177/25.15 |
| D358,415 S | 5/1995 | Klein | D18/51 |
| D361,780 S | 8/1995 | Jenkins | D18/51 |
| 5,481,464 A | 1/1996 | Ramsden | 705/407 |
| 5,490,077 A | 2/1996 | Freytag | 705/405 |
| 5,606,508 A | 2/1997 | Thiel | 705/410 |
| 5,608,636 A | 3/1997 | Guenther | 705/408 |
| 5,615,120 A | 3/1997 | Schwartz et al. | 705/407 |
| D380,770 S | 7/1997 | Muchenberger et al. | D18/51 |
| 5,656,799 A | 8/1997 | Ramsden et al. | 177/2 |
| 5,699,258 A | 12/1997 | Thiel | 705/409 |
| 5,710,706 A | 1/1998 | Markl et al. | 705/409 |
| 5,729,459 A | 3/1998 | Brandien et al. | 705/402 |
| 5,731,980 A | 3/1998 | Dolan et al. | 705/410 |
| 5,787,400 A | 7/1998 | Weber | 705/1 |
| D398,335 S | 9/1998 | Friedrich et al. | D18/51 |
| 5,831,220 A | 11/1998 | Ramsden et al. | 177/1 |
| 5,841,076 A * | 11/1998 | Schwartz et al. | 177/25.13 |
| 5,852,813 A | 12/1998 | Guenther et al. | 705/408 |
| D404,422 S | 1/1999 | Beckstrom et al. | D18/51 |
| 5,905,232 A * | 5/1999 | Schwartz et al. | 177/25.15 |
| D414,798 S | 10/1999 | Brooks et al. | D18/51 |
| 6,047,273 A | 4/2000 | Vaghi | 705/410 |
| 6,064,981 A * | 5/2000 | Barni et al. | 705/26 |
| 6,064,991 A | 5/2000 | Reisinger et al. | 705/401 |
| 6,098,057 A | 8/2000 | Dlugos | 705/407 |
| 6,105,014 A | 8/2000 | Ramsden et al. | 705/410 |
| 6,175,825 B1 | 1/2001 | Fruechtel | 705/404 |
| 6,233,568 B1 | 5/2001 | Kara | 705/410 |
| 6,249,778 B1 | 6/2001 | Vaghi | 705/407 |
| D452,266 S | 12/2001 | Weirsman et al. | D18/51 |
| 6,356,882 B1 | 3/2002 | Carroll et al. | 705/401 |
| 6,426,471 B1 | 7/2002 | Gubitose | 177/25.15 |
| 6,884,946 B2 * | 4/2005 | Miller et al. | 177/25.13 |

* cited by examiner

DOWNLOADABLE DIGITAL RATE CALCULATING SCALE

DESCRIPTION

TECHNICAL FIELD

The present invention is generally directed to a rate downloadable postal scale; and more particularly, to a digital rate calculating scale having software for obtaining rate information downloaded to the scale from a computer or other device, for use in calculating the amount of postage of an item weighed by the scale.

BACKGROUND OF THE INVENTION

Postage scales are utilized to weigh letters or other parcels in order to enable a user to determine the amount of postage required to mail the letter or parcel. In order to obtain an accurate postage amount, it is necessary to obtain and utilize the most current rate information of a desired carrier and shipping method. In the past, this was accomplished by periodically exchanging a cartridge having current rate information. However, this required manufacturing and shipping the cartridges, which added cost to the process. Moreover, rate changes made prior to receiving the newest cartridge could not be implemented, potentially resulting in having an incorrect postage amount.

Today, some postage scales are connected via a line or bus to a computer having access to the Internet. The scales provide the computer with information about the weight of the letter or parcel, and the computer uses current rate information obtained from an Internet site to calculate the postage. The computer must be provided with the appropriate software to make the calculations. Moreover, in this environment, the computer must necessarily be placed close to the scale in order for a user to both efficiently weigh the letter or parcel, and obtain the calculated postage amount. This is because the user must place the letter or parcel on the scale and then move to the computer to obtain a postage amount. The present invention offers a more efficient scale capable of performing the postage calculations at the scale.

SUMMARY OF THE INVENTION

The present invention provides a downloadable digital downloadable rate calculating scale and software that allows a user to weigh parcels, and to download and/or calculate shipping rates of various carriers (e.g., UPS, FedEx, Airborne, etc.) and shipping methods (i.e., service types such as first class, second class, overnight a.m. delivery, overnight afternoon delivery, two day delivery, etc.). Preferably, the calculating scale is operably connected via a serial connector to a computer or other similar device. The computer may be a personal computer workstation (PC), a personal digital assistant (PDA), or the like. Postage rate information is downloaded to the computer from a website. The rate information is then downloaded from the computer to the downloadable rate calculating scale. The downloadable rate calculating scale can then calculate the postage fee or amount for a letter or package weighed by the scale, for a user selected carrier and method. The amount can be calculated on a zip code to zip code basis. While rate information may be stored on, or obtained by the computer, all postage fees are calculated in the scale. Additionally, the downloadable scale includes a feature which compares the rates of a first carrier and/or service provided by that carrier with that of a second carrier (or two service types offered by the same carrier).

In one embodiment of the invention, a downloadable postage rate calculating device comprises a scale for providing an electronic signal indicative of a weight of an article. The scale includes a platform for placement of the article. The device further includes a communication port and a controller, wherein the controller is configured to receive the signal indicative of the weight of the article, and current rate data through the communication port in the scale. The controller is further configured to calculate a first postage amount for the article using at least a portion of the rate data received through the communication port, and the weight of the article provided by the scale.

The device can further include a user interface. The user interface typically includes a display and a plurality of input keys. Specific input keys on the user interface can be configured to perform certain functions in the device. For example, a first input key can be used for selecting a first carrier for calculating the postage amount. Similarly, a second input key can be used for selecting a first shipping method or service type offered by the first carrier. A third input key can be used for selecting a destination country. In fact, a particular button can be dedicated to a specific country that is used more frequently than others. The selections may appear on the display, and the appropriate input key can be used to scroll to the desired carrier, shipment method, country, etc.

The current rate data may include postage rates information for a plurality of carriers. Additionally, the first postage amount calculated by the controller can be for a first carrier from the plurality of carriers. The user can select the first carrier through the user interface. The postage rates information may also include postage rates for a plurality of service types offered by the first carrier, as well as a plurality of service types offered by the other carriers. In this instance, the first postage amount calculated by the controller can be for a first service type of the plurality of service types. Again, the user can select the first service type through the user interface in the device.

To receive the current rate data, the downloadable postage rate calculating device further comprises a line extending from the communication port in the device to a computer. The computer is configured to access a distributed network of computers, such as the Internet, to obtain the current rate data from a server computer or database that maintains updated rate information. Alternatively, the communication port may comprise a wireless transmission element, such as Bluetooth technology, for wireless communication with the computer. In another alternative embodiment, the device may be capable of directly accessing the Internet, either through a line to a cable or phone connection, or again, through a wireless connection. In this embodiment, the device may include a conventional web browser or other software for accessing a server computer and obtaining the current rate data.

The first time the computer connects to the appropriate Internet site, it can download software to facilitate obtaining the current rate data and passing it along to the postage rate calculating device. The software can be configured to allow for customization of portions of the current rate data received from the Internet site. For example, if a particular user of a device has a negotiated rate for a particular carrier and/or service (e.g., the user has negotiated or otherwise receives a 10% discount on all or certain select services offered by UPS), the negotiated rate can be used to appropriately adjust the data to be downloaded to the rate calculating device. The rate calculating device will then apply the negotiated rate for the particular carrier(s) or service(s) at issue.

The controller can be further configured to compare the first postage amount with a second postage amount representing an amount of postage required to deliver the article using a second carrier for a second service type (the second service type may be the "equivalent" service to that offered by the first carrier, e.g., both may be identified as "first class" by the respective carriers). Alternatively, the controller can compare two service types offered by the same carrier.

In another embodiment, a downloadable parcel weighing and postage calculating device comprises a housing including a scale having a platform for receiving a parcel. The scale is configured to provide an electronic signal indicative of the weight of the parcel. The device further includes a communication port in the housing for receiving current rate data and, a rate calculating circuit in the housing electronically coupled to the scale and to the communication port. The rate calculating circuit is configured to receive the electronic signal indicative of the weight of the parcel and the current rate data, and calculate a first postage amount for the parcel. The rate calculating circuit may be a microprocessor.

In another embodiment, a method for calculating a postage amount comprises the steps of providing a scale for weighing an article, weighing the article using the scale to generate weight data for the article, downloading rate information to the scale from a source of information remote from the scale, calculating a first amount of postage for the article based on at least a first portion of the rate information received by the scale and the weight data and, displaying the calculated postage amount for the article. The method may further comprise selecting a first carrier from a plurality of carriers, and selecting a service type from a plurality of service types for the first carrier.

The method may further comprise calculating a second amount of postage for the article based on at least a second portion of the rate information received by the scale and the weight data, wherein the first portion of the rate information is a postage rate for a first carrier and the second portion of the rate information is a postage rate for a second carrier. After this calculation, the method may comprise comparing the first amount of postage and the second amount of postage.

The method may also include receiving the rate information from a computer connected to a distributed network of computers, such as the Internet.

In yet a further embodiment, a downloadable postage rate calculating device comprises an electronic scale having a platform for receiving an article to be weighed wherein the scale is capable of generating an electronic weight signal of the article. The device further comprises a postage rate calculating circuit electronically coupled to the scale for receiving the weight signal. The postage rate calculating circuit is also configured to receive current rates information from a remote source and calculate a postage amount for the article based on the weight signal, and at least a portion of the current rates information. The device includes a user interface including a display, and a plurality of input keys in the user interface electronically coupled to the postage rate calculating circuit. The device further includes a communication port for receiving the current rates information over a serial line.

Further aspects of the invention are disclosed in the detailed description of the preferred embodiment, the drawings and the claims.

DETAILED DESCRIPTION OF THE PREFERRED EMBODIMENT

Figure 1:
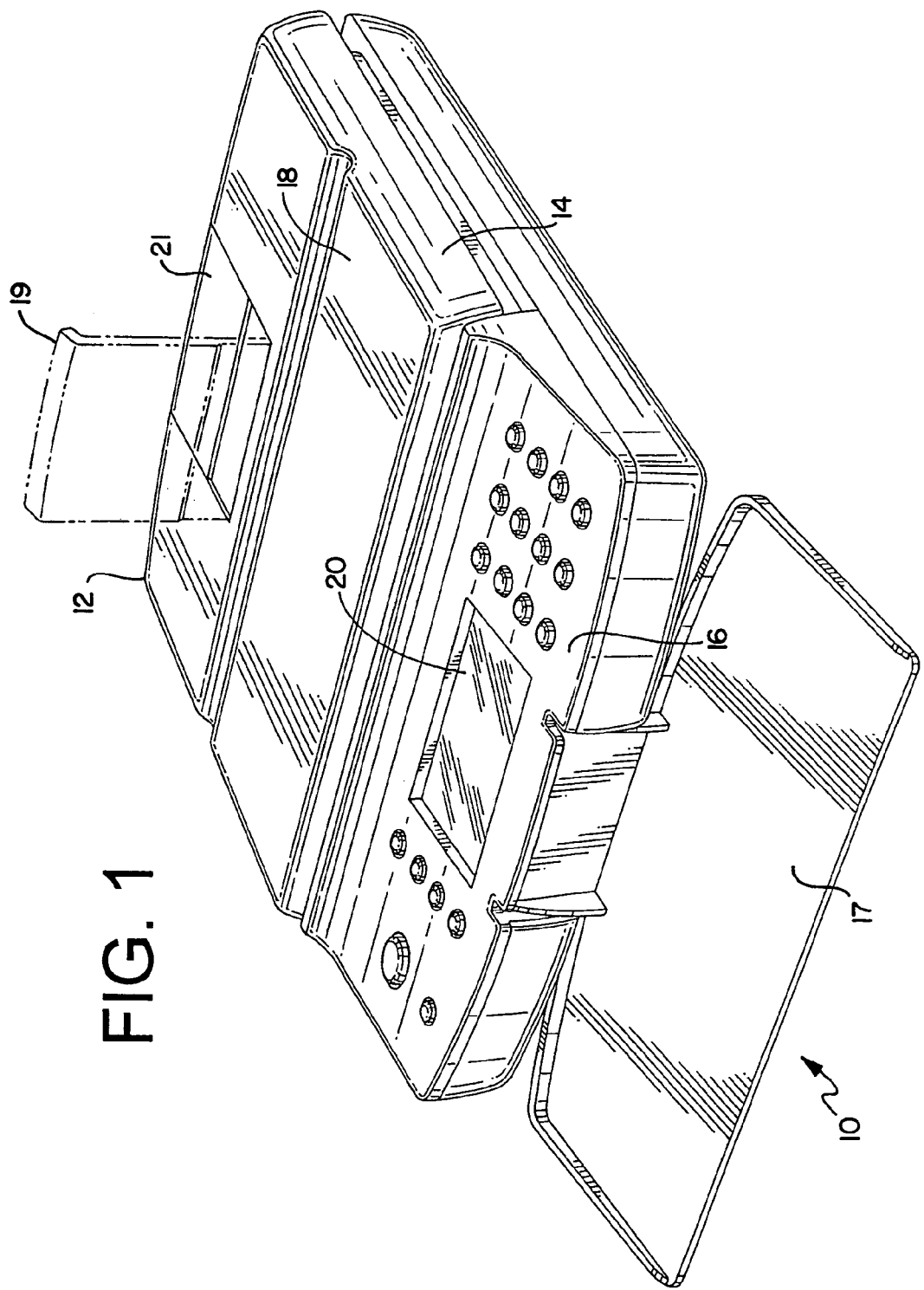
FIG. 1 is a perspective view of the downloadable rate calculating device of the present invention.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

The present invention provides a downloadable scale for weighing an item or article, such as a package, parcel, letter or envelope, and calculating a postage amount for the item. The scale downloads current rates information or rate data for a variety of carriers and shipping methods (which may be referred to as "service types") offered by the carriers, and using at least a portion of the information (e.g., the rate for a specific user selected carrier and shipping method) and the weight of the item, calculates and displays the postage amount. The downloadable scale includes a microprocessor, or other electrical circuitry to accomplish the downloading and calculation. The microprocessor may include a memory or be coupled to a memory for maintaining the downloaded rates information.

The device 10 is connected to (or otherwise communicates with) a computer or other apparatus capable of communicating over a distributed network of computers, such as the Internet, for obtaining and downloading the current rates information. The current rates information is preferably posted on an Internet website that periodically updates the rates for the carriers and shipping methods. The rates may be updated one or more times each day, or whenever a change is made by one of the carriers.

Referring to FIG. 1, a downloadable rate calculating scale or device 10 is shown. The device 10 has an outer housing 12 that provides structure for a scale portion 14 and a user interface portion 16. The scale portion 14 and user interface portion 16 of the device 10 form a single cohesive unit. The housing is preferably formed from a high impact ABS material.

The scale portion 14 includes a platform 18 for weighing an article, such as a letter or parcel. The platform 18 forms part of the outer housing 12 of the device 10 and is also made of a high impact ABS material.

When the article is placed on the platform 18, the scale portion 14 of the device 10 creates an electrical signal indicative of the weight of the article. Specifically, the weight of the article on top of the platform 18 is applied through a linkage to a load cell that generates an analog signal directly proportional to the weight of the article being measured. This electrical signal is digitized and calibrated through electronic circuitry in the housing, and can be displayed (in either pounds or kilograms) on a display panel 20 in the user interface portion 16.

The user interface portion 16 includes the display panel 20, and a plurality of input keys 22 for controlling the functions of the device 10. The display panel 20 is preferably an LCD display or readout. However, other conventional displays may be used. Moreover, a touch sensitive display can be utilized, in which case (some or all of) the input keys would be implemented through the touch sensitive display.

Figure 3:
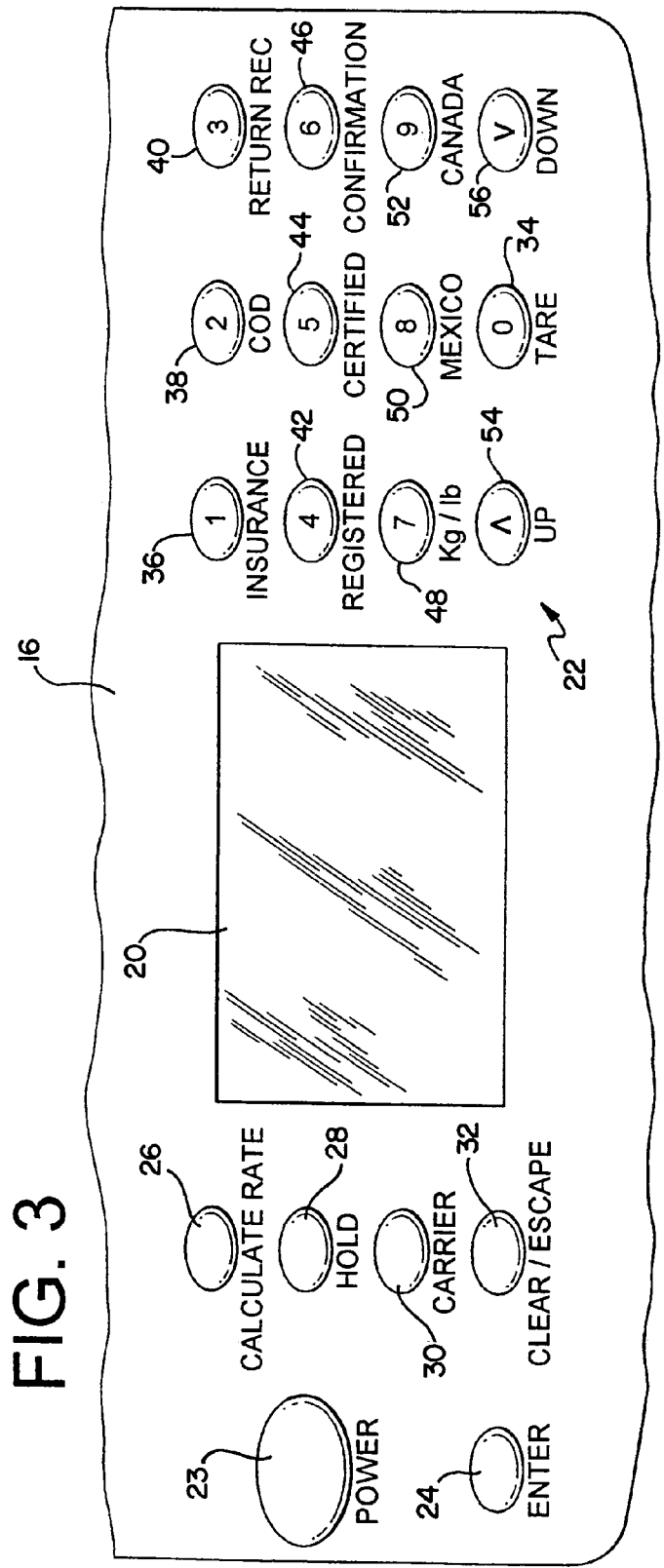
FIG. 3 is a plan view of a user interface of the downloadable rate calculating device of FIG. 1.
Figure 4:
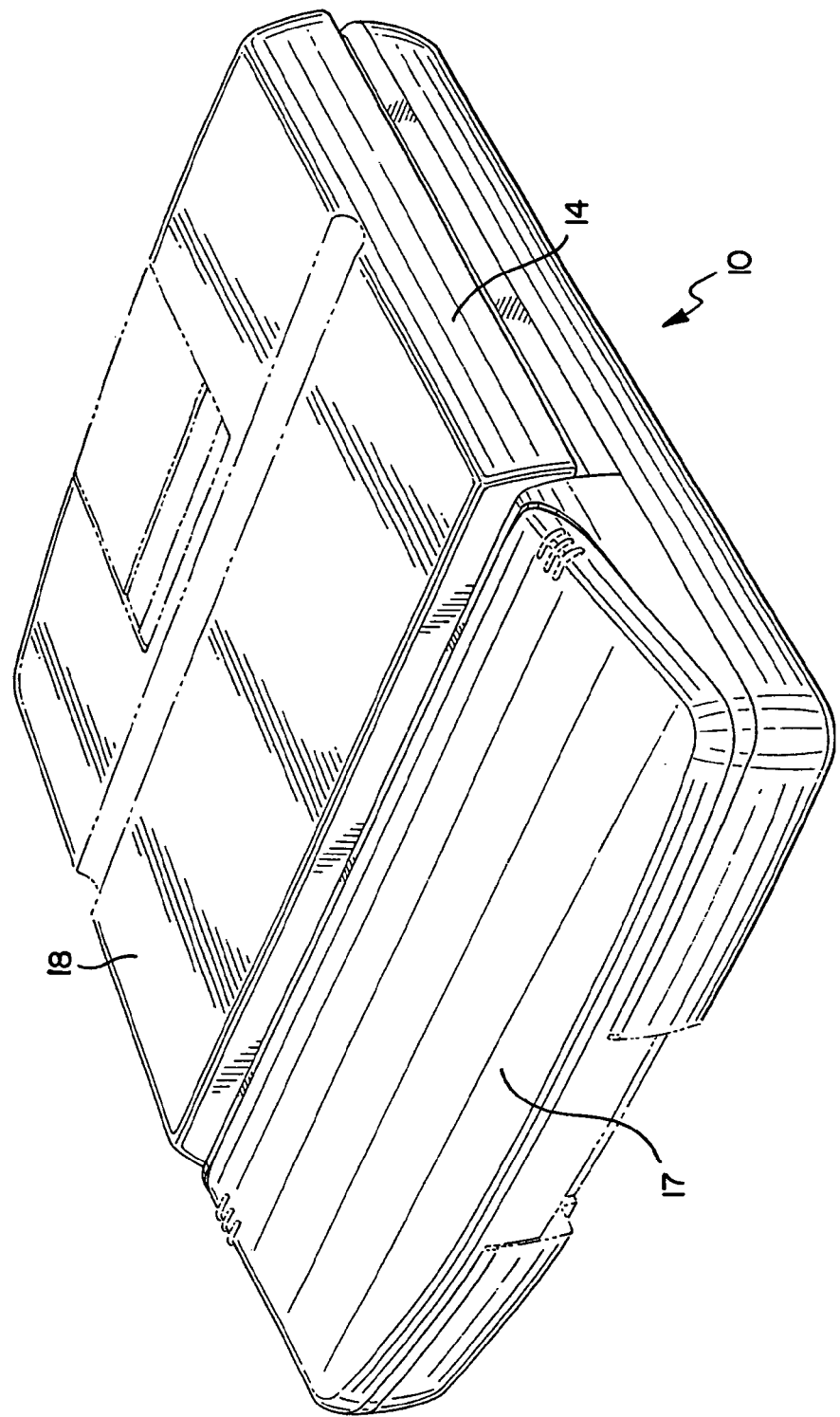
FIG. 4 is a perspective view of another rate calculating device in accordance with the present invention.
Figure 5:
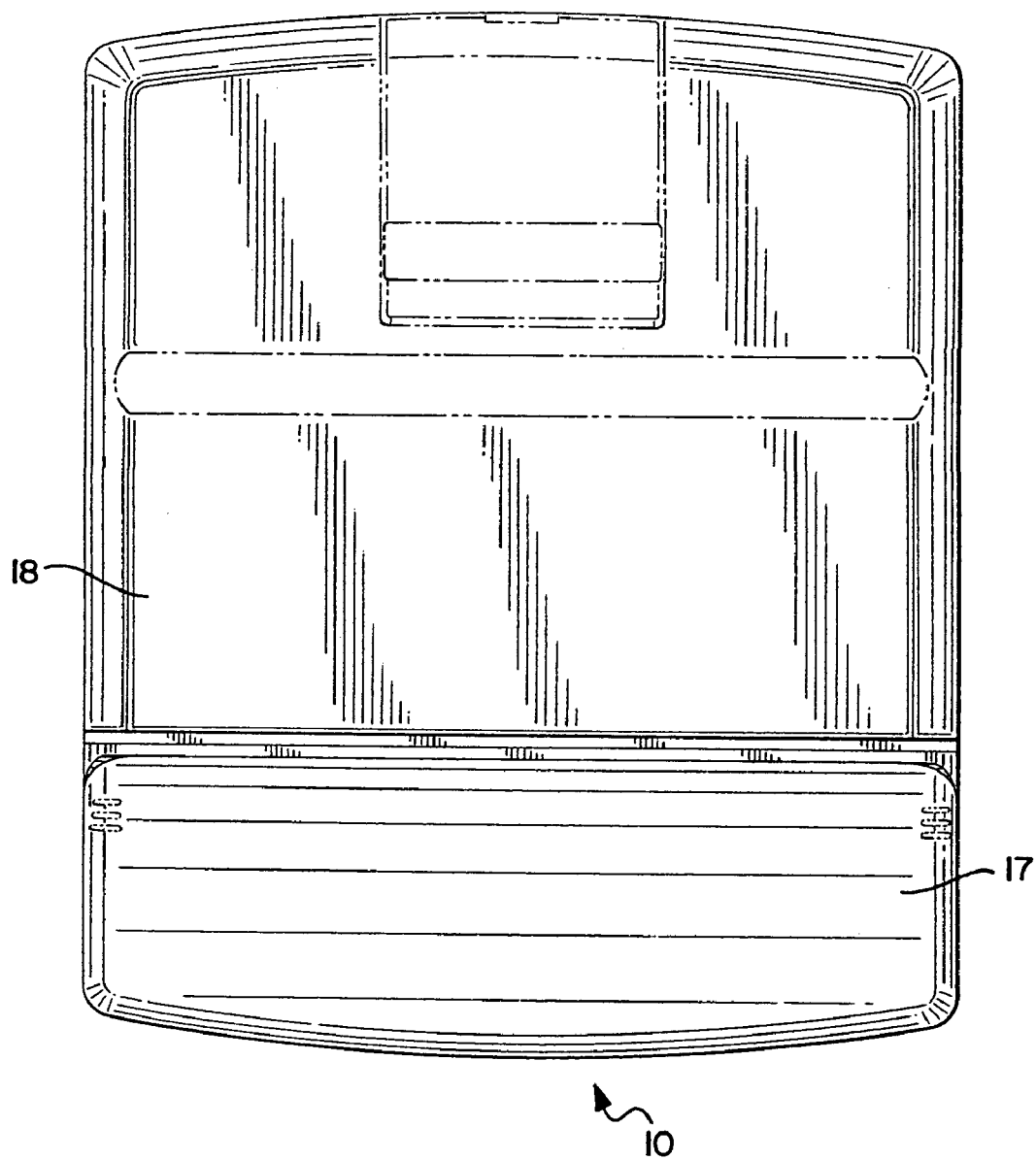
FIG. 5 is a top view of the scale shown in FIG. 4.
Figure 6:
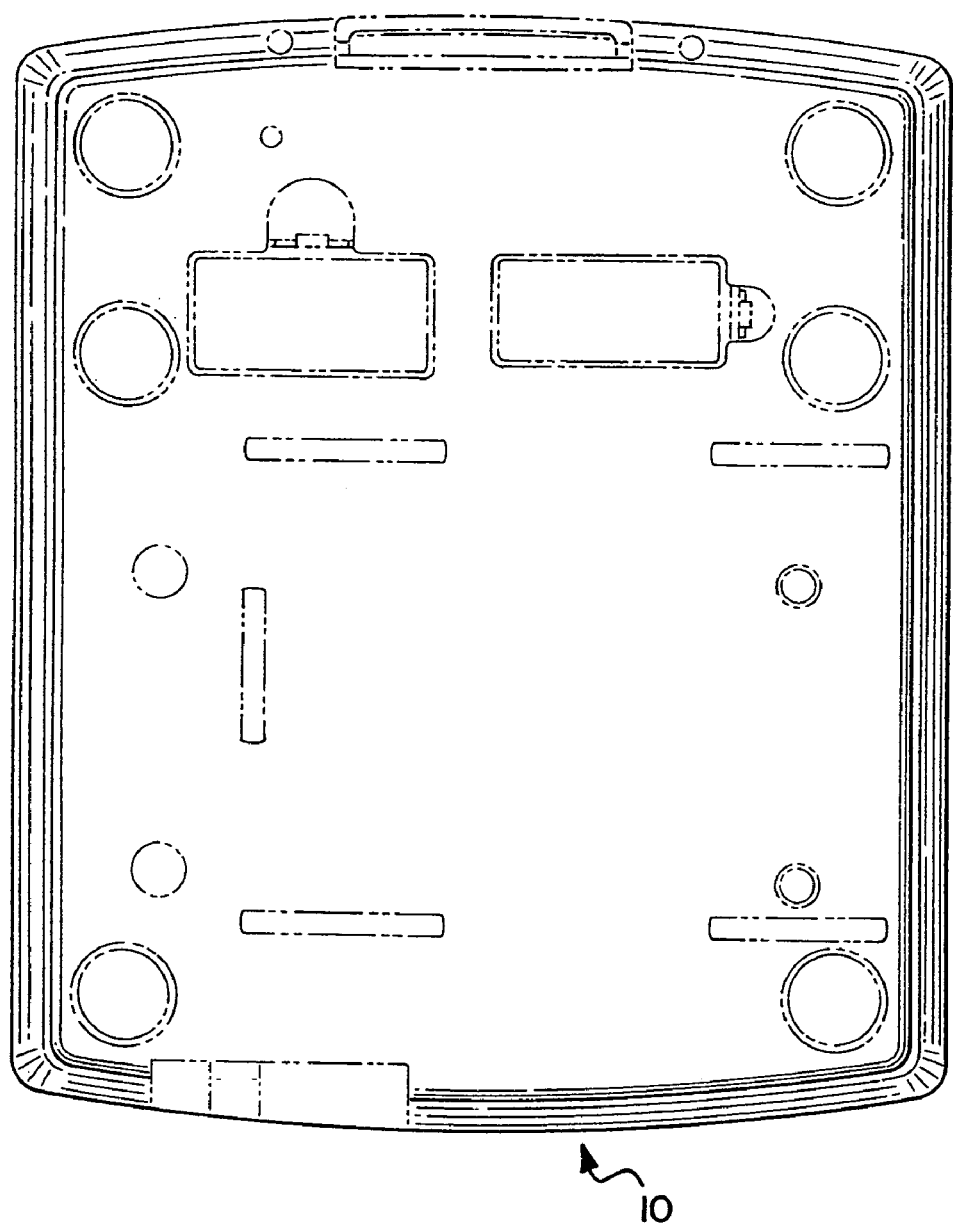
FIG. 6 is a bottom view of the scale shown in FIG. 4.
Figure 7:
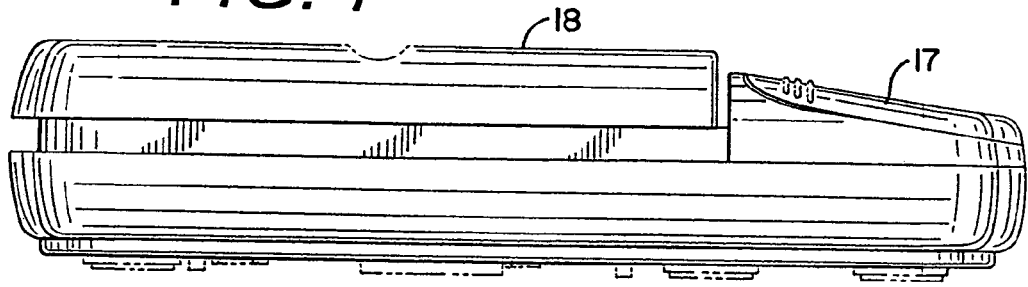
FIG. 7 is a side view of the scale shown in FIG. 4.
Figure 8:
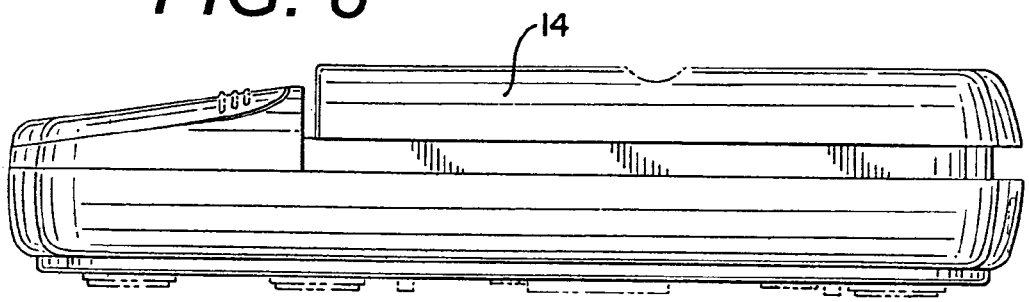
FIG. 8 is an opposite side view of the scale shown in FIG. 7.
Figure 9:
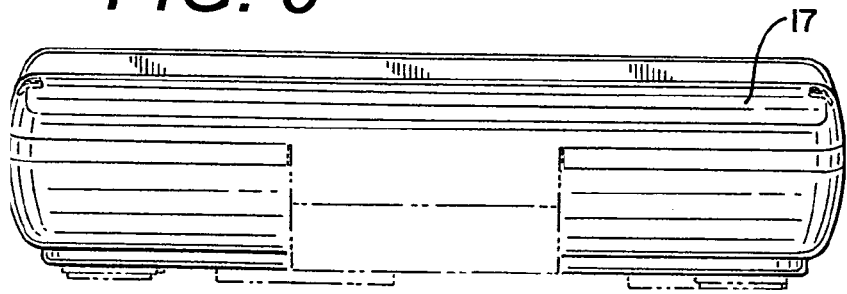
FIG. 9 is a front view of the scale shown in FIG. 4.
Figure 10:
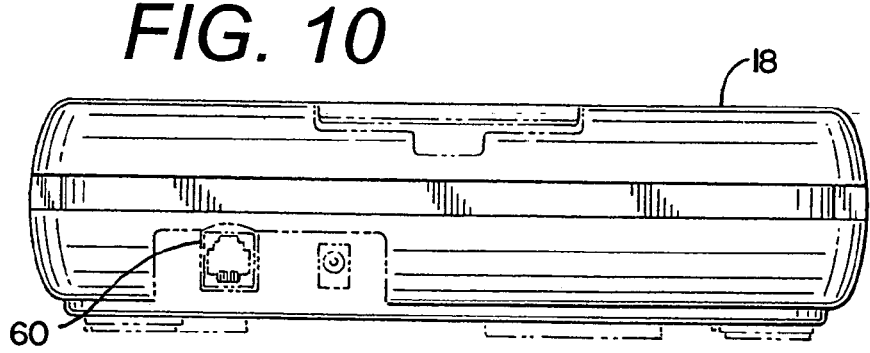
FIG. 10 is a back view of the scale shown in FIG. 4.
Figure 11:
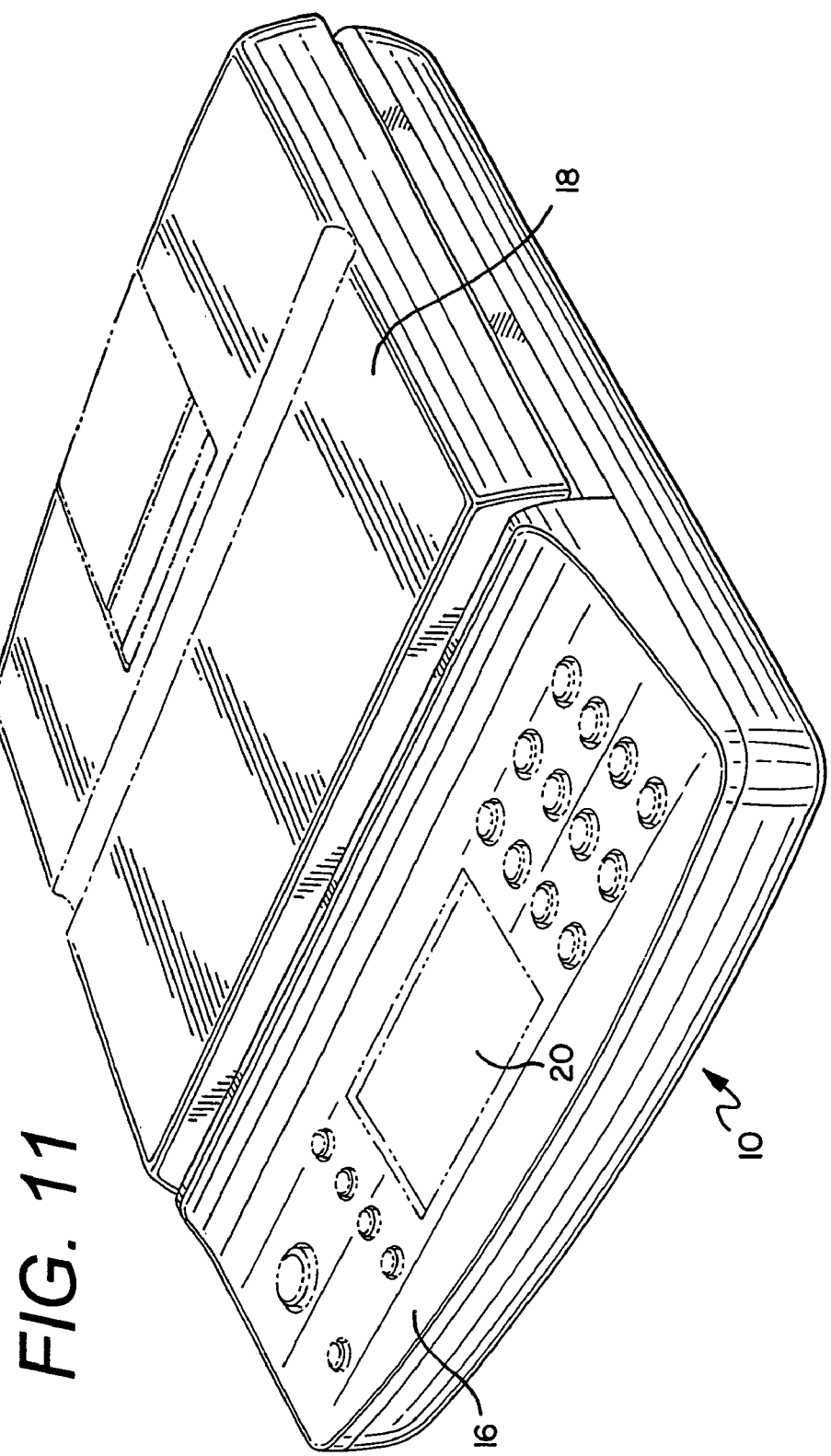
FIG. 11 is a perspective view of yet another embodiment of a rate calculating device in accordance with the present invention.
Figure 12:
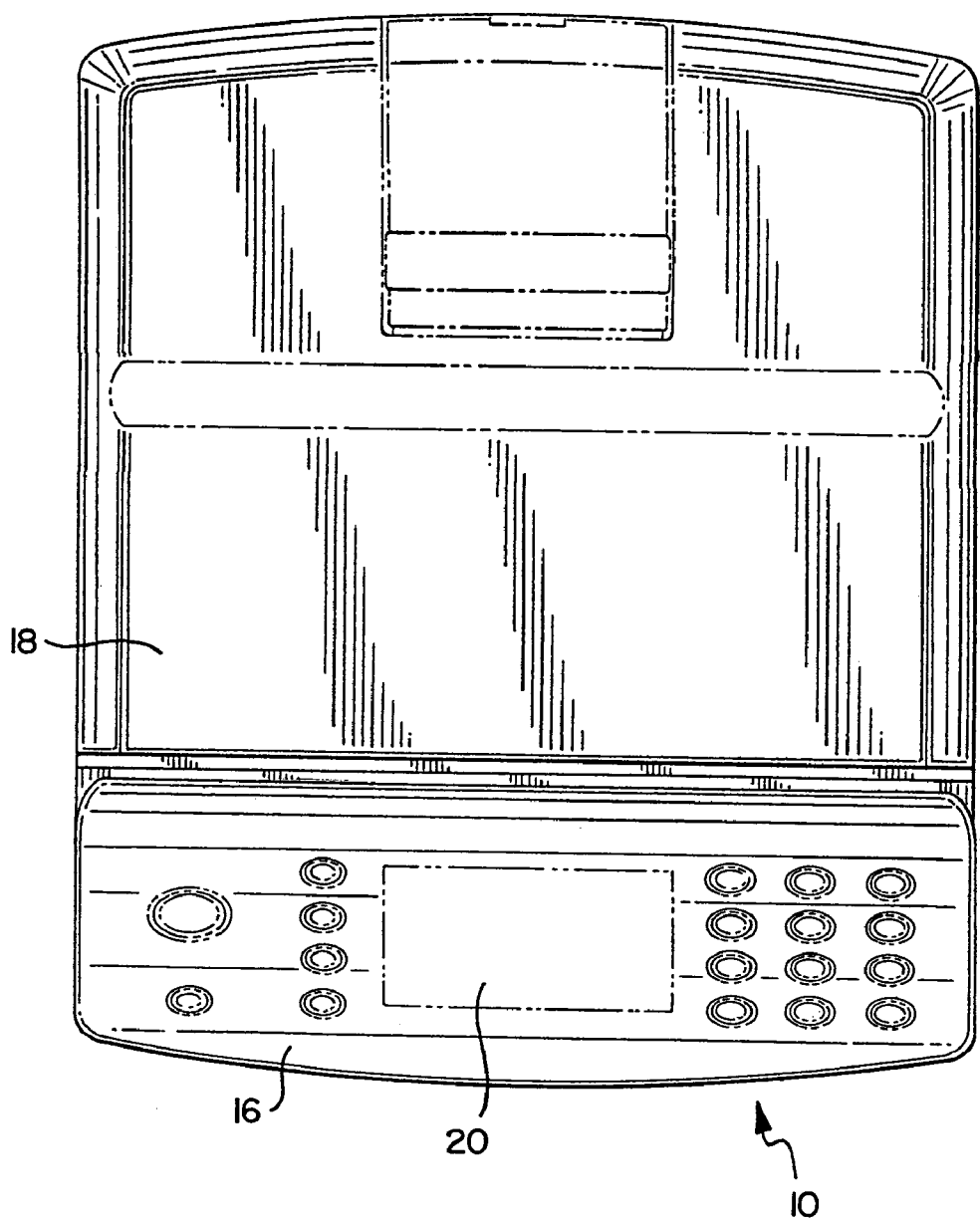
FIG. 12 is a top view of the scale shown in FIG. 11.
Figure 13:
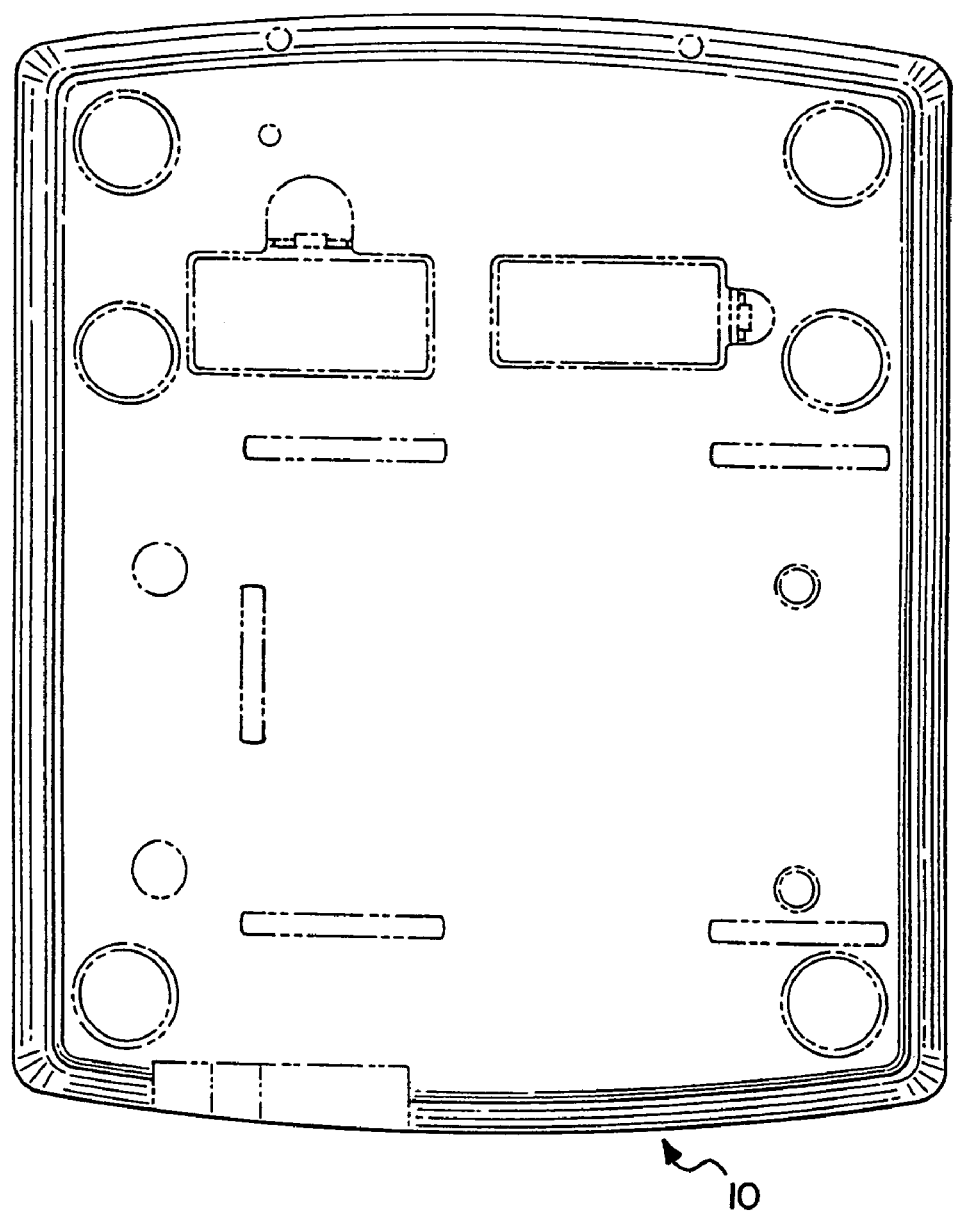
FIG. 13 is a bottom view of the scale shown in FIG. 11.
Figure 14:
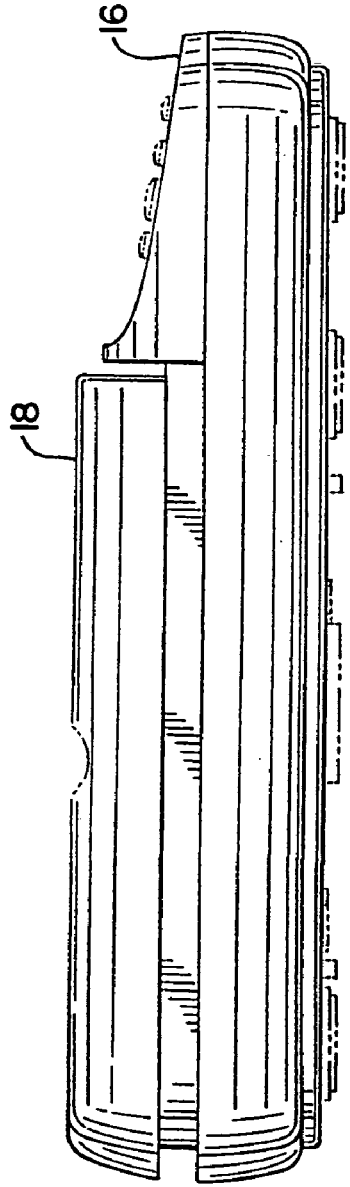
FIG. 14 is a side view of the scale shown in FIG. 11.
Figure 15:
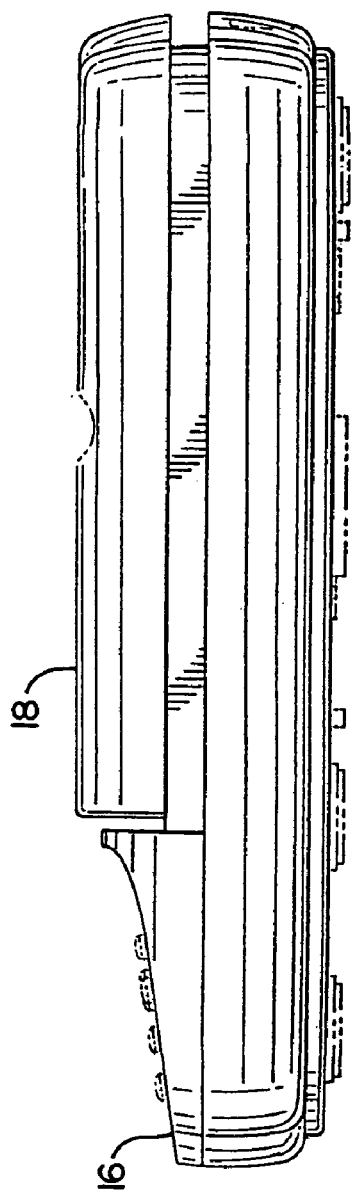
FIG. 15 is an opposite side view of the scale shown in FIG. 14.
Figure 16:
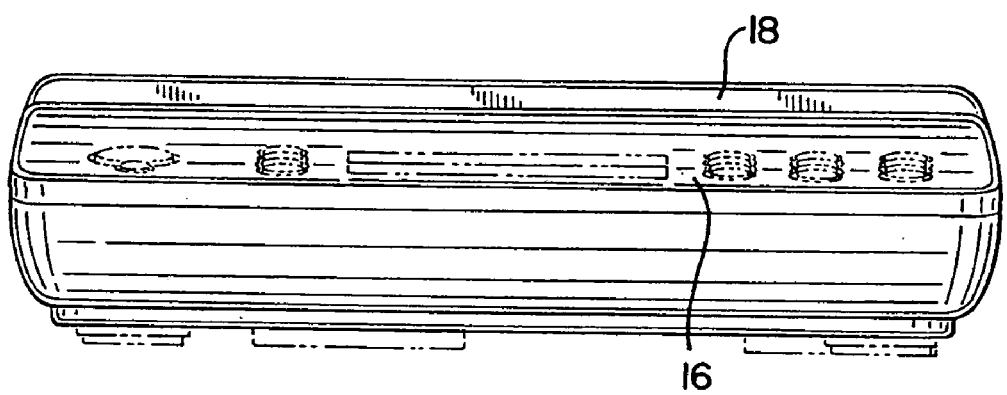
FIG. 16 is a front view of the scale shown in FIG. 11.
Figure 17:
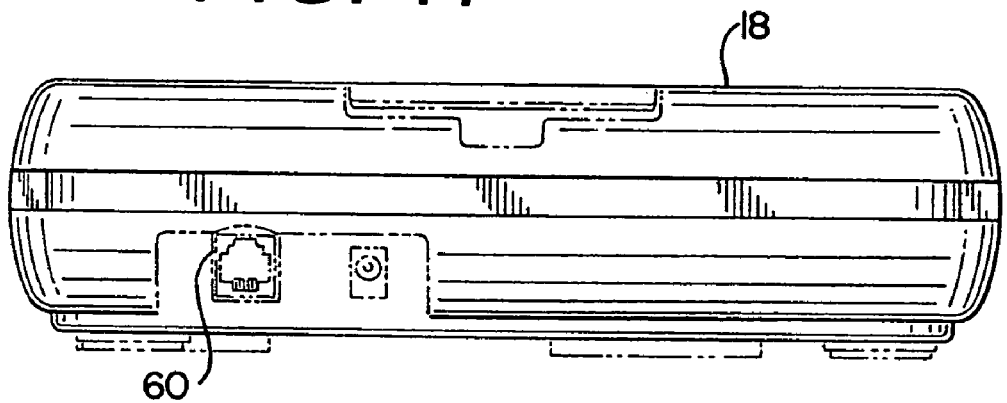
FIG. 17 is a back view of the scale shown in FIG. 11.

As shown in FIG. 3, according to one embodiment of the present invention, the user interface portion 16 includes a power key 23 on the left hand side of the display 20 (when facing the device 10) for turning the device 10 on and off. The user interface portion 16 also includes an enter key 24; a calculate rate key 26; a hold key 28 (which may be used to calculate and display rates for larger packages that obscure or block the display when being weighed); a carrier key 30 (toggle through carriers using the up/down keys); and a clear/escape key 32 (used to correct an incorrect entry) on the left hand side of the display 20. On the right hand side of the display 20, the user interface portion 16 includes number input keys "0" through "9" having reference numbers 34, 35, 38, 40, 42, 44, 46, 48, 50 and 52, respectively, and scroll "up" and "down" keys 54 and 56.

Each of the input keys on the right hand side can be toggled to perform another function or otherwise modify the calculations. The "1" key 36 can be toggled to add insurance to the postage amount (the device 10 can be configured to request the value of the item being mailed to calculate the correct insurance amount). The "2" key 38 can be toggled to make the postage COD. The "3" key 40 can be toggled to require a return receipt. The "4" key 42 can be toggled to indicate that the item be shipped registered mail and the "5" key 44 can be toggled to indicate certified mail. The "6" key 46 can be toggled to require a confirmation. The "7" key 48 can be toggled to select the displayed weight to be pounds or kilograms. The "8" and "9" keys 50 and 52 can be set to indicate shipment to specific countries, such as Mexico and Canada (a controller connected to the input keys may allow the selection of other countries by inputting a country code, or scrolling through a list appearing on the display using the up and down keys).

The "0" key 34 can be toggled to implement a tare function. By pressing this button the user will be able to zero out the weight that is on the platform (up to the capacity amount, e.g., 40 pounds). However, the scale will not weigh objects over the capacity. Moreover, at initial startup the scale will not tare any excessive weight on the platform 18 because this may cause misuse of the scale maximum capacity. When the scale is powered off, the tare function will be deactivated, except for the initial tare of the platform weight. The tare function may also have a distinctive tone through a speaker in the housing. If the user attempts to perform a function that is not correct (such as improper use of the tare function), the scale 10 will emit an error message or tone, and display a short message depicting what is wrong.

The input keys 22 are preferably buttons made of silicon rubber. The buttons preferably sit at an elevation of no less then 3/16" above the housing 12. The buttons also should not compress more than half their height, or be allowed to fit under the housing when pressed by a user.

The device 10 includes a electronic controller 63 within the housing for controlling the functions of the device 10, and calculating a postage amount. As previously mentioned, the controller 63 preferably includes a microprocessor, but may also be a hardwired circuit or a programmable logic controller.

Figure 2:
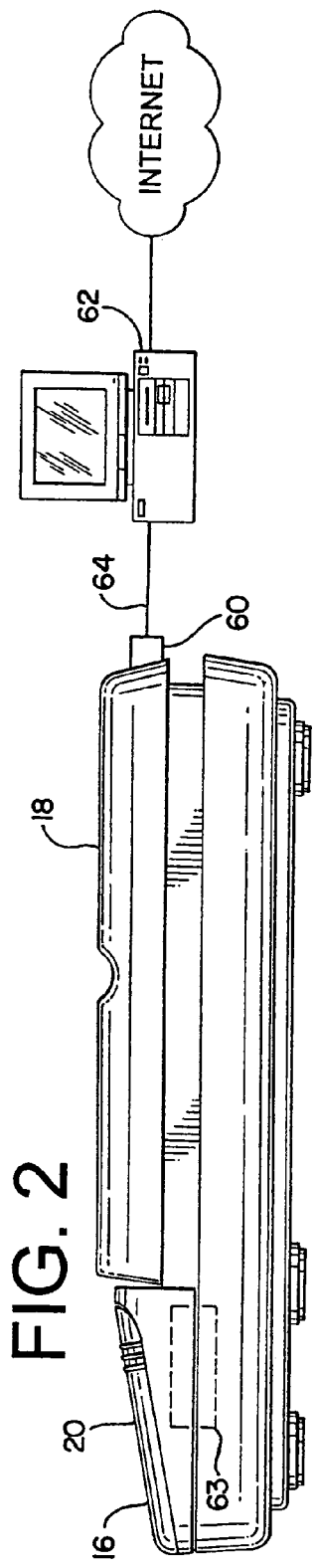
FIG. 2 is a perspective view of a side of the downloadable rate calculating device of FIG. 1 connected to a computer.

As shown in FIG. 2, the device 10 includes a communication port 60 for communicating with a remote source, such as a computer 62 or other similar apparatus. The communication port is preferably a serial port utilizing RJ11 to DB9 technology. The communication port can also be a USB port. The communication port 60 is connected by a line 64 (preferably a serial bus) to the computer 62. Alternatively, the communication port 60 may include wireless technology for wireless communication with the computer 62.

The rates information can be maintained on a server computer accessible over the Internet. The computer 62 can obtain the current rates information from the server computer using standard Internet software, and then download the current rates information to the device 10. During the initial download to the computer 62, software for communicating with the device 10 can be provided. The software can be configured to facilitate downloading of current rates data to the device. The software may also allow for modifying, repairing or changing the programming of the device 10 from the computer. In one embodiment of the invention, the software can be used to customize all or a portion of the current rates information to be downloaded to the device 10 (in instances where the device 10 directly accesses the Internet site for obtaining current rates information, aspects of the functionality described can be implemented by the device 10 itself). That is, users having negotiated rates or otherwise not required to pay the normally quoted rates (e.g., the rates posted on the Internet site), can customize the rate information before it is downloaded to the device 10. For example, a user that negotiated or otherwise is entitled to a 10% discount for a particular carrier (e.g., UPS, Federal Express or Airborne) or specific service types offered by the carrier, can have the 10% discount applied to the current rates information (for the specified carrier/service type) obtained from the Internet site prior to downloading to the device 10. The device 10 will then calculate the negotiated rate.

In another embodiment of the invention, the device 10 may be connected by a line to an outlet for a phone or cable line. In this embodiment, the device can directly access the Internet rather than obtaining information from the computer 62 over the dedicated line 64. The microprocessor can be provided with appropriate software for Internet access. Again, wireless technology can also be used to access the Internet directly.

After the rates information is downloaded to the device 10, all rate calculations can then be performed by the controller 63 in the device 10. That is, the device 10 is a stand alone unit in that it does not have to be connected to the computer 62 or the Internet to provide a desired postage amount for a letter or other parcel placed on the scale. The device 10 only needs to be connected for the initial rates information download and rate updates. Once the device 10 receives such information, it may be disconnected from the computer 62 or Internet and continue to function.

The functionality of the device 10 can also be updated remotely through the device's connection to the computer 62 or the Internet. A remote flash memory unit can be utilized to facilitate such updating.

In operation, a user, after turning "on" the device 10, can place an article on the platform 18 of the scale portion 14, and select a carrier and shipping method for calculating postage for the article using the appropriate buttons. The scale portion 14 will weigh the article and generate an analog electrical signal indicative of the weight of the article. The analog signal is converted to a digital signal in an analog to digital converter. The circuitry for generating the weight signal can be part of the controller 63 circuitry, or a separate circuit in the housing in communication with the controller 63 circuitry, or a combination thereof.

The controller 63 obtains current rates information via the communication port 60 from the computer 62 (which in turn preferably obtains the current rates information over the Internet from a server computer maintained with the current rates). Preferably, the current rates information includes rate information for a plurality of carriers and a plurality of shipping methods used by the carriers. Using at least a portion of the current rates information (i.e., rates for the selected carrier and shipping method), and the weight of the article, the controller 63 calculates the postage amount for shipping the article via the selected carrier and shipping method. The postage amount, weight, and carrier/method selected are displayed on the display panel 20. All of the calculations are performed by the controller 63.

Preferably, the postage rate is calculated on a zip code to zip code basis. The origination and destination zip codes are entered by a user of the device. However, the device can be designed to set up the origination zip or postal code (i.e., the zip code of the location the device is maintained) as a default option, and therefore not require reentry each time a parcel is weighed. All the postal codes (e.g., zip codes) for a given region (e.g., the United States and its Territories) can be stored in the scale at an initial download. The device would only need to be updated when the rates change, or a modification is made to the one or more postal code. While one embodiment of the present invention includes all the zip codes for the United States and each of its territories, it is contemplated that the scale also store postal codes for various non-U.S. countries and territories.

The device 10 can also be used to compare postage between a first shipping method offered by a first carrier, and a second shipping method offered by a second carrier. The device can also compare postage between a first and second shipping method offered by a single carrier.

In one preferred embodiment, the computer 62 connected to the device 10 is set up to facilitate downloading the current rates information to the device 10. This may require a user to log onto a particular web site location that maintains the current rates information (one location presently known is www.pelouze.com) and register with the site. The user could then initially download the relevant information to the computer 62, which will in turn, download the information to the device 10.

The device 10 can include a key pad/display protective cover 17, also made of high impact ABS, that is pivotally mounted to the front of the housing. The cover 17 can be swung over the user interface portion 16 when the device 10 is not in use. The device can also include a letter stand 19 (shown in phantom in an upright position) pivotally attached to the scale platform 18. The letter stand 19 can be positioned upright to facilitate weighing one or more letters. For larger parcels, the letter stand 19 can be lowered into a recess 21 in the platform 18.

The device can be powered by a battery, such as a NiCad or Lithium battery, that is contained in the housing. However, it is contemplated that the device of the present invention can be powered through an AC adapter plugged into an outlet, or any other power sources suitable for powering a digital scale. Preferably, all internal steel components are to be zinc plated.

In one embodiment, the scale may include an auto-off feature. If the scale has not been used for a certain amount of time (e.g., 60 seconds) the scale 10 will emit a distinctive tone through a speaker (not shown) in the housing, and shut off. The scale would allow a user to deactivate this feature as desired.

The scale may also include an overload alert. The scale will emit an overload message with any weight that exceeds the scale's capacity (e.g., 40 pounds). However, for items over a predetermined amount (e.g., 42 pounds), the device 10 can be provided with load cell protection features which would then kick in. The load cell protection should be able to withstand three times maximum capacity of the scale. The overload alert may also emit a distinctive tone.

The scale will preferably have a capacity of either forty pounds, twenty pounds, or five pounds. However, it is contemplated by the present invention that this technology can be used in connection with parcels of greater capacities without departing from the present invention. Additionally, it is preferable that the scale should be sensitive to 0.1 ounces or 2 grams, and have an accuracy of plus or minus 0.1 ounces. However, those of skill in the art will immediately recognize that the invention should not be limited to scales of this sensitivity.

While specific embodiments have been illustrated and described, numerous modifications are possible without departing from the spirit of the invention, and the scope of protection is only limited by the scope of the accompanying claims.

We claim:

1. A downloadable postage rate calculating device comprising:
   a scale for providing an electronic signal indicative of a weight of an article,
   the scale including a communication port and a controller, the controller configured to receive the signal indicative of the weight of the article, the controller further configured to actively request and receive current rate data through the communication port in the scale and calculate a first postage amount for the article.

2. The downloadable postage rate calculating device of claim 1 wherein the scale further includes a user interface, the user interface including a display and a plurality of input keys.

3. The downloadable postage rate calculating device of claim 2 wherein the current rate data includes postage rates information for a plurality of carriers, and the first postage amount calculated by the controller is for a first carrier from the plurality of carriers.

4. The downloadable postage rate calculating device of claim 3 wherein the postage rates information includes postage rates for a plurality of service types offered by the first carrier, and the first postage amount calculated by the controller is for a first service type of the plurality of service types.

5. The downloadable postage rate calculating device of claim 1 further comprising a line extending from the communication port to a computer.

6. The downloadable postage rate calculating device of claim 1 wherein the communication port comprises a wireless transmission element.

7. The downloadable postage rate calculating device of claim 1 wherein the scale includes a platform for placement of the article.

8. The downloadable postage rate calculating device of claim 2 wherein the user interface includes a first input key for selecting a first carrier for calculating the postage amount.

9. The downloadable postage rate calculating device of claim 8 wherein the user interface includes a second input key for selecting a first service type for calculating the postage amount.

10. The downloadable postage rate calculating device of claim 9 wherein the user interface includes a third input key for selecting a destination country.

11. The downloadable postage rate calculating device of claim 1 wherein the first postage amount represents an amount of postage required to deliver the article using a first carrier for a first service type, the controller further configured to compare the first postage amount with a second postage amount representing an amount of postage required to deliver the article using a second carrier for a second service type.

12. A downloadable parcel weighing and postage calculating device comprising:
   a housing including a scale having a platform for receiving a parcel, the scale configured to provide an electronic signal indicative of the weight of the parcel;
   a communication port in the housing for receiving current rate data; and,
   a rate calculating circuit in the housing electronically coupled to the scale and to the communication port, the rate calculating circuit configured to receive the electronic signal indicative of the weight of the parcel and actively request and receive the current rate data, and calculate a first postage amount for the parcel.

13. The downloadable parcel weighing and postage calculating device of claim 12 wherein the rate calculating circuit comprises a microprocessor.

14. The downloadable parcel weighing and postage calculating device of claim 12 further comprising a user interface including a display.

15. The downloadable parcel weighing and postage calculating device of claim 14 further comprising a plurality of input keys.

16. The downloadable parcel weighing and postage calculating device of claim 12 wherein the communication port is connected by a line to a computer.

17. The downloadable parcel weighing and postage calculating device of claim 12 wherein the communication port comprises a wireless communication element.

18. The downloadable parcel weighing and postage calculating device of claim 12 wherein the current rate data includes postage rates for a plurality of carriers, and the rate calculating circuit utilizes a first postage rate for a first carrier to calculate the first postage amount.

19. The downloadable parcel weighing and postage calculating device of claim 18 wherein the current rate data includes postage rates for a plurality of service types for each of the plurality of carriers, and the rate calculating circuit utilizes a first postage rate for a first service type for the first carrier to calculate the first postage amount.

20. The downloadable parcel weighing and postage calculating device of claim 12 wherein the scale has a capacity of forty pounds.

21. The downloadable parcel weighing and postage calculating device of claim 15 wherein the user interface includes a first input key for selecting a first carrier from a plurality of carriers.

22. The downloadable parcel weighing and postage calculating device of claim 15 wherein the user interface includes a second input key for selecting a service type from a plurality of service types for the first carrier.

23. The downloadable parcel weighing and postage calculating device of claim 22 wherein the user interface includes a third input key for selecting a destination country.

24. The downloadable parcel weighing and postage calculating device of claim 12 wherein the first postage amount represents an amount of postage for a first carrier, and wherein the rate calculating circuit is configured to calculate a second postage amount representing an amount of postage for a second carrier.

* * * * *